United States Patent [19]

Saito et al.

[11] Patent Number: 4,549,260
[45] Date of Patent: Oct. 22, 1985

[54] CYCLE TIMER

[75] Inventors: Toshio Saito, Kobe; Kenzo Matsumoto, Hirakata; Kazuo Soji, Kadoma, all of Japan

[73] Assignee: Matsushita Electric Industrial Co., Ltd., Osaka, Japan

[21] Appl. No.: 397,021

[22] Filed: Jul. 12, 1982

[30] Foreign Application Priority Data

Jul. 14, 1981 [JP] Japan .................. 56-110297

[51] Int. Cl.⁴ .............. G05B 19/02; G05B 15/02; H01H 43/00
[52] U.S. Cl. .................... 364/143; 364/183; 364/569; 364/571; 340/347 P; 340/347 CC; 318/632; 250/231 SE
[58] Field of Search .............. 364/569, 559, 143, 144, 364/145, 183, 571; 340/347 SY, 347 P, 347 CC, 825.83; 377/17, 82, 84, 88; 318/572, 632, 633, 634; 250/231 SE

[56] References Cited

U.S. PATENT DOCUMENTS

| | | | |
|---|---|---|---|
| 3,705,400 | 12/1972 | Cordes, Jr. | 340/347 M |
| 3,812,351 | 5/1974 | Coberley | 377/17 X |
| 4,075,707 | 2/1978 | Wilmer | 364/900 |
| 4,155,003 | 5/1979 | Grassme | 377/17 |
| 4,206,507 | 6/1980 | Payling | 340/825.83 |
| 4,214,191 | 7/1980 | Watanabe et al. | 318/572 |
| 4,293,915 | 10/1981 | Carpenter et al. | 364/145 |
| 4,299,104 | 11/1981 | Hayama et al. | 364/571 X |
| 4,340,939 | 7/1982 | Mayer | 340/347 SY |
| 4,443,788 | 4/1984 | Breslow | 340/347 P |
| 4,462,082 | 7/1984 | Thiele et al. | 364/571 |

FOREIGN PATENT DOCUMENTS 55-28135 2/1980 Japan .

*Primary Examiner*—Jerry Smith
*Assistant Examiner*—Allen MacDonald
*Attorney, Agent, or Firm*—Birch, Stewart, Kolasch & Birch

[57] ABSTRACT

A cycle timer comprises an angle encoder for converting an mechanical angle information into an electrical angle information, a memory unit for storing timing information and a control program for setting an output if the angle information falls within an on region of predetermined timing information and for resetting the output if the angle information falls within an off region of the predetermined timing information, an arithmetic processing unit for reading out and outputting from the memory a timing condition of the information which has been outputted from the angle encoder, and a latch circuit adapted to be selectively set and reset one at a time in response to the output from the arithmetic processing unit.

8 Claims, 11 Drawing Figures

CYCLE TIMER

The present invention relates to a cycle timer for use in controlling the sequence of operation of any known machine.

An example of the conventional means for timing control operation during a sequential control of any known machine includes such a cycle timer as disclosed in the Japanese Laid-open Patent Publication No. 55-28135. The cycle timer disclosed in this publication utilizes a rotary encoder for detecting angle information related to machine position for use as timing signals. The timing signals from the rotary encoder are compared with a predetermined timing information stored in a memory, an output signal being subsequently generated when they have found coincidence with each other. This known cycle timer has been considered advantageous in that both the setting accuracy and the reproductivity had been improved, requiring reduced time for adjustment. However, the following disadvantages have also been found.

(1) The prior art cycle timer described above does not have the capability of setting an arbitrary angle of the rotary encoder with respect to a reference point. Therefore, it is necessary to make the original position of the machine coincide with the zero point of the cycle timer as determined by the rotary encoder which is coupled to the shaft which generates the angle information of the machine. Since this adjustment is to be performed in confined space in the machine, it can not be easily performed and it has been physically difficult to make the coincidence within a certain tolerance.

(2) Also each output terminal of the known cycle timer described above has been unable to generate set and reset outputs two times or more during each cycle. This would be required in a machine with two shafts geared together at a gear ratio of 2:1. In such a case synchronized timing of the shafts for such a gear ratio requires one shaft, to set two times during each cycle. In this case, two output terminals are required to obtain a single timing waveform and also an external OR circuit must be added.

The present invention has been developed with a view to substantially eliminating the above described disadvantages, the details of which will be described in conjunction with a preferred embodiment thereof with reference to the accompanying drawings, in which:

FIG. 3 is a conversion table showing angle display data and angle information stored in a fixed memory;

FIG. 6 is a table for storing angle information a, b and c shown in FIG. 4; and

Figure 1:
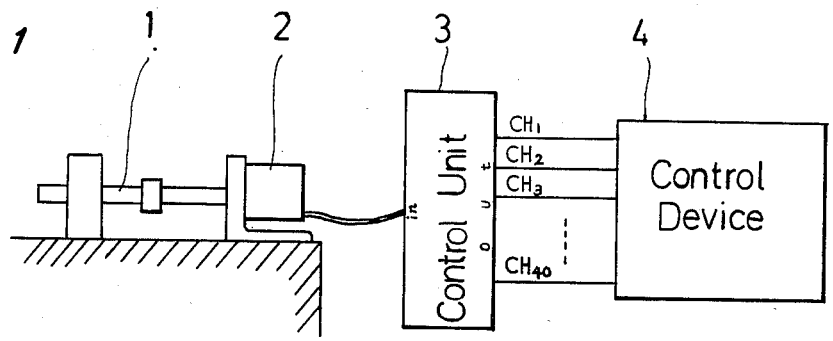
FIG. 1 is a schematic diagram showing a construction of a cycle timer embodying the present invention.

Referring first to FIG. 1, reference numeral 1 represents a shaft for generating the timing signals necessary to control a machine. This shaft 1 is generally operatively associated with the operation of the machine. To this shaft 1, an absolute type rotary encoder 2 which converts the angle of rotation of the shaft 1 into a coded signal, is coupled. The coded signal emerging from the encoder 2 is fed to a control unit 3 of the cycle timer. The control unit 3 supplies to a control device 4 the timing signals necessary to effect control of the device 4 in dependence on the rotation of the shaft 1 on the basis of timing information indicative of an ON-OFF state of an output signal previously programmed in the control unit 3 and a signal given by the rotary encoder 2.

Figure 2:
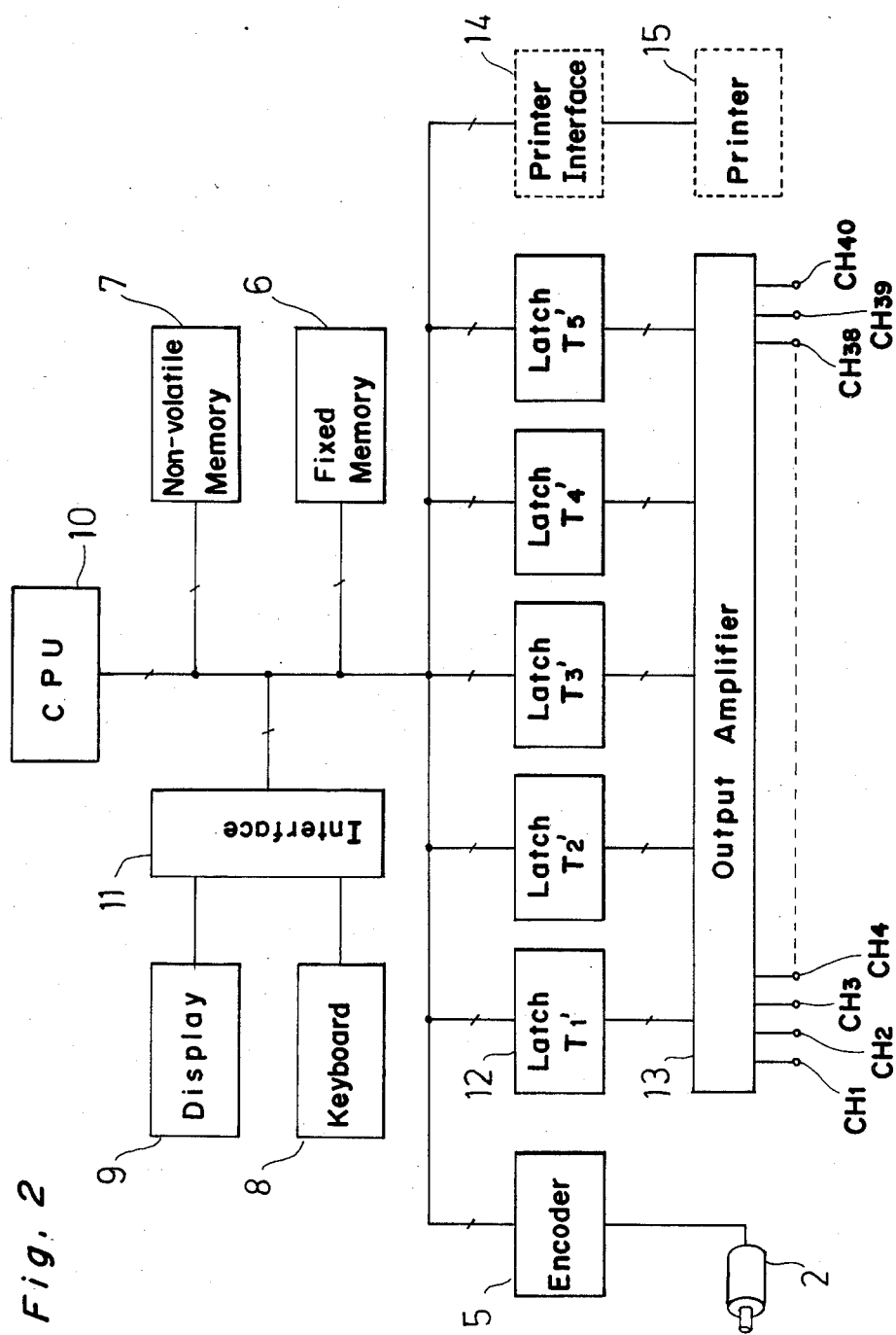
FIG. 2 is a block circuit diagram of a control unit used therein.

The details of the control unit 3 of the cycle timer are shown in FIG. 2. Referring to FIG. 2, the control unit 3 includes an encoding circuit 5 for converting the coded signal from the rotary encoder 2 into pure binary codes suited for data processing, and a fixed memory 6 for storing in the form of a command code a programme necessary to control the cycle timer and also for storing, in a manner shown in FIG. 3, a table necessary to convert angle information generated from the encoding circuit 5 into codes suited for display of the angle. In FIG. 3, data i represents electrical angle information. In the instance now under discussion, the data i may take a value within the range of o to FF(H) (H representing a hexadecimal numbering system) and, when i=0, it means electrical angle information corresponding to the original point, that is, 0°, of the machine. Characters $X_i$, $Y_i$ and $Z_i$ represent respective data of angles to be displayed and represent binary coded decimal numbers of the hundreds, tens and units of the respective angles.

The codes necessary for the angle display may be obtained by calculation, but the table is used in the present invention for increasing the response.

Figure 4:
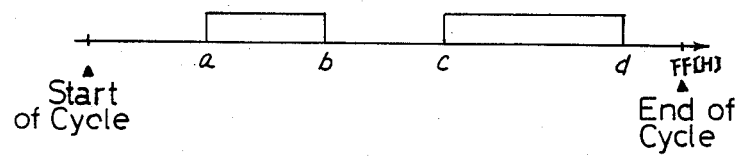
FIG. 4 is a timing chart for each channel.

The control unit 3 also includes a non-volatile memory for storing data concerning on and off regions of each channel, as will be described later, programmed by a keyboard 8 having a plurality of decimal digit key switches, the starting and terminating point of the ON region and original point correcting data indicative of the difference between the machine original point and the original point of the rotary encoder. The term "channel" hereinabove referred to is a name given to a signal outputted from the control unit of the cycle timer and, in the illustrated embodiment, is comprised of 40 channels $CH_1$ to $CH_{40}$. Each channel varies during each cycle in a manner as shown in FIG. 4. In FIG. 4, the interval between the points a and b and that between the points c and d are ON regions, and other intervals are OFF regions, the points a and c being the starting points while the points b and d are the terminating points. In this example, it may be possible to set a=b or c=d. Where the shaft 1 of the machine is to be coupled with the encoder 2, it is not always physically easy to make original point of the machine coincide with the original point of the encoder within a certain tolerance. Accordingly, the cycle timer according to the preset invention is so designed that, even when the encoder and the machine are connected together with the original point of the encoder displaced from that of the machine, the displacement in original point can subsequently be electrically compensated for. That is, the original point correcting data referred to hereinbefore are the electrical angle information which has been outputted from the encoding circuit 5 and then stored in the RAM by means of the keyboard 8 when the machine is in the original point. The cycle timer according to the present invention operates in such a manner that, by subtracting the original point correcting data from the electrical angle information fed from the shaft 1, the machine original point can be made to equivalently coincide with the original point of the encoder.

The usual operation of the cycle timer will now be described with reference to the figures.

Reference numeral 10 represents a central processing unit (hereinafter referred to as "CPU") of a microprocessor With this, the entire cycle timer can be controlled. Reference numeral 11 represents a keyboard switch display interface through which inputs from the keyboard 8 are taken and the display is effected at a display unit 9. Reference numeral 12 represents output latches through which an output signal is fed to an output amplifier 13.

The operation of the cycle timer will now be described with reference to the flow charts shown in FIGS. 7 to 11.

Figure 7:
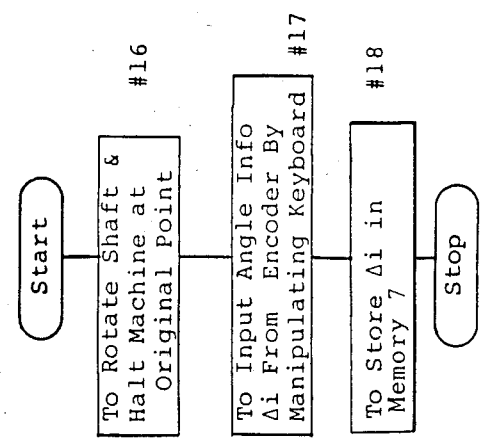
Figure 9:
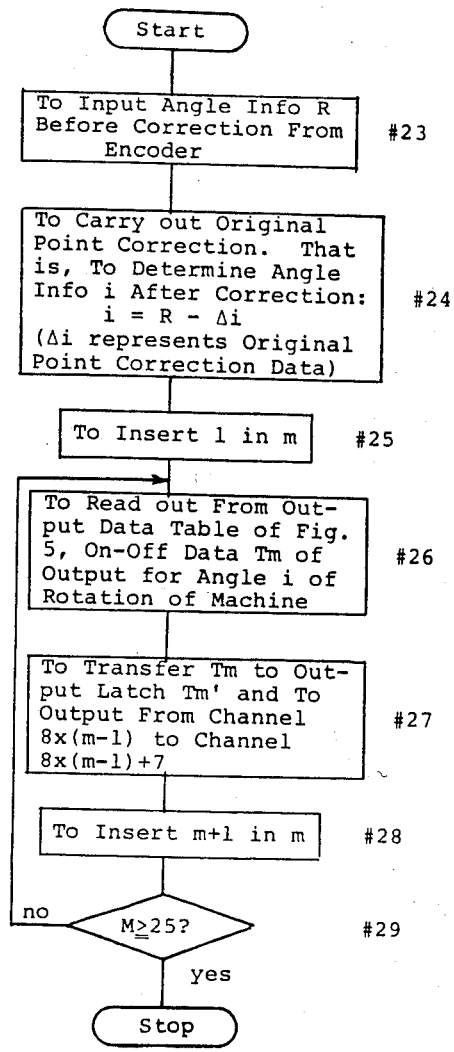

In the first place, the procedure for inputting the original point correcting value will be described with reference to FIG. 7. This procedure starts with the manipulation of the keyboard 8 at the step #16 during which the machine is manually set to the original position. At the subsequent step #17, angle information $\Delta i$ outputted from a code converting circuit of the encoder 2 as a result of the manipulation of the keyboard 8 is inputted, and at the step #18, the angle information $\Delta i$ is stored in the memory 7 as original point correcting data.

Figure 5:
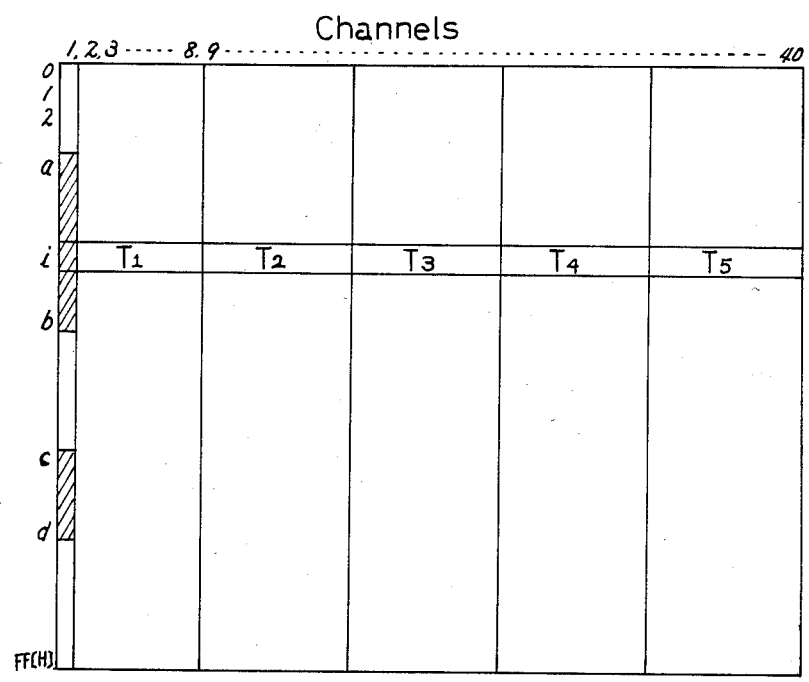
FIG. 5 is a diagram showing timings stored in a non-volatile memory.
Figure 8:
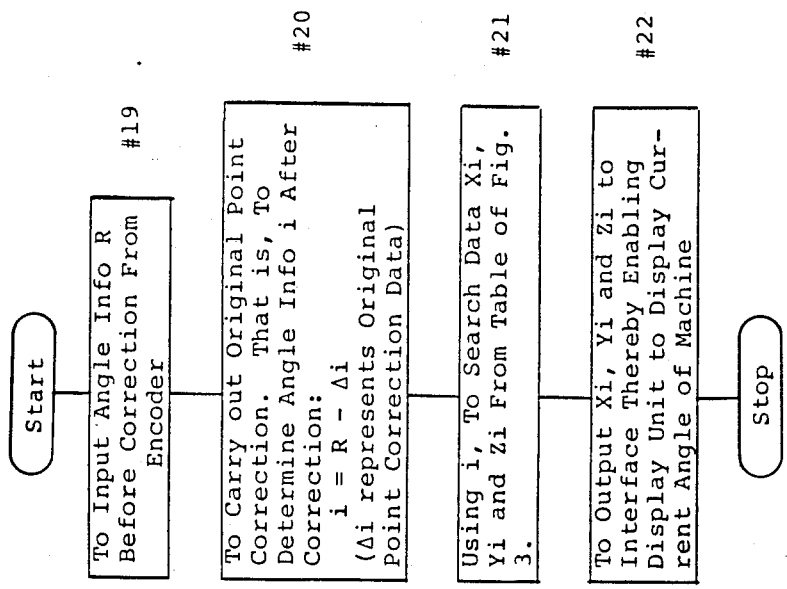
FIGS. 7 to 11 are flow charts showing the sequence of operation of the cycle timer according to the present invention.

The procedure for displaying the current angle of the machine will be described with reference to the flow chart of FIG. 8. At the step #19, angle information R of the machine outputted from the code converting circuit 5 is inputted, and at the subsequent step #20, the original point correcting data i is subtracted from such angle information R. At the step #21, three digit data $x_i$, $y_i$ and $z_i$ for the display are searched from the corrected information i while the table shown in FIG. 3 is utilized. At the step #22, the three digit data are supplied to the interface 11, a display unit 9 will display the current angle occupied by the shaft 1. The procedure for outputting to a channel will now be described with particular reference to FIGS. 5, 6 and 9. FIG. 5 illustrates the table wherein the axis of the ordinate and the axis of the abscissas represent the angle and the channel number, respectively, and wherein, for example, if the channel $CH_1$ outputs such a timing waveform, as shown in FIG. 4, the angle ranges from 0 to a, a to b, b to c, c to d and d to FF[H] under the first column in the table of FIG. 5 represent 0, 1, 0, 1 and 0, respectively are stored. The steps #23 and #24 are to determine the corrected angle information in a manner similar to the steps #19 and #20 in FIG. 8. The operation from the step #25 to the step 190 29 is such that 40 ON-OFF states to be outputted from $CH_1$ to $CH_{40}$ at the angle information i are transferred to latch circuits T'1, T'2, T'3, T'4 and T'5 per each eight bits from the table of FIG. 5 in the order of T1, T2, T3, T4 and T5 and the ON-OFF states for all of the channels at the angle information i is outputted. That is to say, blocks T1, T2, T3, T4 and T5 exactly correspond to the latch circuits T'1, T'2, T'3, T'4 and T'5, respectively.

Even though the angle of rotation of the machine shaft varies, all of the ON-OFF states for any angle of rotation can be outputted by repeating the above described procedure.

Figure 10:
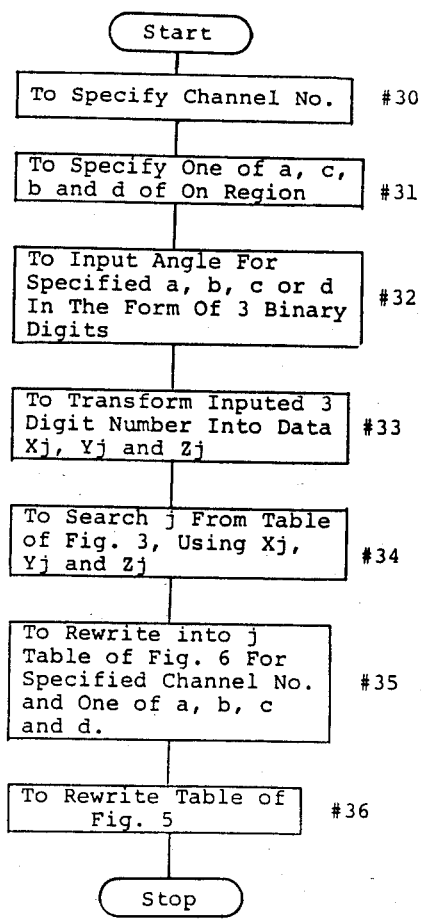

The procedure for inputting data used to determine the ON region of the output signal will be hereinafter described. This procedure can be performed in two ways: by the manipulation of the keyboard and by way of "teaching". FIG. 10 pertains to the procedure performed by the manipulation of the keyboard and reference to FIG. 10 will be made first.

At the step #30, the channel number to which the data is to be set is specified, followed by the step #31 at which one of a, b, c and d shown in FIG. 4 is specified. Assuming that a is specified, the angle a is supplied in the form of a number of three figures at the step #32. At the subsequent step #33, the CPU converts this number of three figures into data $x_j$, $y_j$ and $z_j$ for the display of the angle, then performs a search to find angle information j corresponding thereto from the table of FIG. 3 at the step #34. At the step #35 the angle information is transferred to the table of FIG. 6 stored in the memory 7 and, at the step #36, of the timing condition of FIG. 5 is written on the basis of these data. By rewriting the timings b, c and d in a similar manner, the timing for one channel completes. Thus, it will readily be seen that, by rewriting the subsequent channels sequentially, the timings for all of the channels can be set.

The data inputting procedure by way of "teaching" will now be described with reference to FIG. 11.

As can readily be understood from FIG. 2, the CPU can be made to have a capability of directly transferring the angle information of the machine, which has been supplied from the encoding circuit, to the table of FIG. 6 and then rewriting the timing conditions of FIG. 5 on the basis thereof. This method by which the angle of timing signals can be set is hereinafter referred as "teaching".

Figure 11:
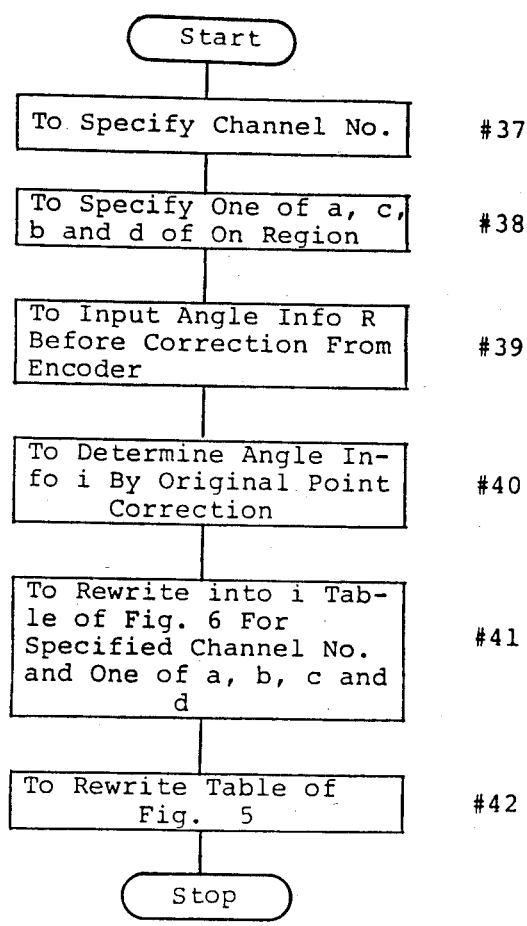

Referring to FIG. 11, the steps #37 and #38 are similar to the steps #30 and #31 shown in FIG. 10. At the step #39, the angle information from the encoder 2 is inputted directly rather than from the keyboard, which is in turn used to correct the original point at the step #40. At the subsequent step #41, the table of FIG. 6 is rewritten for the angle information i, which has been corrected, by the utilization of the channel specified at the step #41 and one of a, b, c and d which has been specified. At the step #42, the table of FIG. 5 is rewritten.

By utilization of this "teaching", it is desired possible to manually move an object to be controlled, that is, the shaft 1, to a position necessary for the timing control, to store the current angle information of the shaft in the above described manner, and to set the timing for alignment by repeating the above described procedures sequentially. In addition, the above described two methods may be concurrently used in a mixed form.

Although the present invention has fully been described in conjunction with the utilization of the keyboard for setting the timing, in the case of mass-production machines, the setting of the timing can be done in reduced time only by making the original points coincide with each other electrically if the timing information is stored in the fixed memory once the control timing has been determined without relying on the keyboard.

Although reference has been made to the use of the CPU, any suitable arithmetic processing unit may be employed instead of the CPU.

In addition, although it has been described that the number of repetition of on and off of each channel for each channel is two, it can be increased as desired by increasing the table of FIG. 6.

As hereinbefore described, the cycle timer according to the present invention is advantageous over the prior art in the following respects.

(1) No mechanical adjustment to coincide the original point of the object to be controlled, that is, the shaft, with that of the encoder is required and, therefore, any possible error in angle due to displacement which would occur during the mechanical adjustment can be eliminated with the minimized time required to perform the coinciding operation.

(2) Even in the case where the timing effective to set actuators of identical design to be controlled two times or more for each cycle is required, timing outputs of two or more channels are utilized to give the timing for each channel without any additional circuit components required.

Although the present invention has fully been described in connection with the preferred embodiment thereof with reference to the accompanying drawings, it is to be noted that various changes and modifications are apparent to those skilled in the art. Such changes and modifications are to be understood as included within the true scope of the present invention unless they depart therefrom.

What is claimed is:

1. A cycle timer for controlling the ON-OFF periods of the operating cycle of a machine comprising:

encoder means for detecting the angle of rotation of a shaft of the machine and generating angle information indicative of the angular position of the machine shaft detected therefrom;

read-in and read-out memory means for the storage of data descriptive of ON-OFF states of output signals corresponding to the angle information, said memory means storing data descriptive of the ON-OFF states of a plurality of output signals including one or a plurality of ON regions for each output signal, the output signals corresponding to respective angle information to be read out in parallel output channels;

program means for writing the data in the memory means in correspondence with an arbitrary angular position of the machine shaft; and output means for simultaneously reading out the data from the memory means for each of said parallel output channels in response to a given angular position of said machine shaft detected by said encoder means to turn on and off output signals from the timer, to control said ON-OFF periods.

2. A cycle timer as claimed in claim 1, wherein said program means comprises means for selecting one of said plurality of output channels and data setting means for writing ON-OFF data, corresponding to the angular position of the machine shaft, in the memory means corresponding to the one of the output channels selected by said selecting means.

3. A cycle timer as claimed in claim 2, wherein said data setting means comprises an original point correcting means for writing in the memory means the angle information, as original condition correction data, which is obtained by the encoder means when the machine shaft is positioned at an original point, a keyboard arrangement for inputting values of angles of starting and terminating points of the ON region for the output channel selected by the selecting means, and angle setting means for writing in the memory means the ON-OFF states of the output channel corresponding to the angular position of the machine shaft according to the angle value inputted from the keyboard arrangement.

4. A cycle timer as claimed in claim 3, wherein said output means comprises means for reading out from the memory means the ON-OFF states corresponding to the angular position of the machine shaft according to the angle information determined by both the original point correcting means and the encoder means, and an output device for outputting said ON-OFF data.

5. A cycle timer as claimed in claim 2, wherein said data setting means comprises first teaching means for writing in the memory means the angle information fed from the encoder means in response to the manual positioning of the machine shaft to a selected angle, as a starting point of the ON region of the output channel selected by the selecting means, second teaching means for writing in the memory means angle information fed from the encoder means in response to the manual positioning of the machine shaft to a selected angle, as a terminating point of the ON region of the output selected by the selecting means, and a keyboard arrangement for selecting one of the first and second teaching means.

6. A cycle timer as claimed in claim 5, wherein said data setting means further includes an original point correcting means for writing in the memory means angle information, as original condition correction data, which is obtained by the encoder means when the machine shaft is manually positioned at an original point.

7. A cycle timer as claimed in claim 2, wherein said data setting means comprises an original point correcting means for writing in the memory means the angle information, as original condition correction data, which is obtained by the encoder means when the machine shaft is manually positioned at an original point, a keyboard arrangement for inputting values of angles of starting and terminating points of the ON region for the output selected by the selecting means, first angle setting means for writing in the memory means the ON-OFF states of the selected output channel corresponding to the angle of the machine shaft according to the angle value inputted from a keyboard arrangement, first teaching means for writing in the memory means angle information, fed from the encoder means in response to the manual positioning of the machine shaft to a selected angle, as a starting point of the ON region of the output channel selected by the selecting means, second teaching means for writing in the memory means the angle information fed from the encoder means in response to the manual positioning of the machine shaft to a selected angle as a terminating point of the ON region of the output channel selected by the selecting means, a keyboard arrangement for selecting one of the first and second teaching means, and a second angle setting means for writing in the memory means the ON-OFF data of the output, corresponding to the angle of the machine shaft, according to both the angle information on the starting and terminating points of the ON region, which have been inputted from the first and second teaching means, respectively, and the original point correction data given by the correcting means.

8. A cycle timer as claimed in claim 2, wherein said data setting means includes an original point correcting means for writing in the memory means angle information, as original condition correction data, which is obtained by the encoder means when the machine shaft is manually positioned at an original point.

* * * * *